United States Patent
Barrass

(10) Patent No.: US 8,107,365 B2
(45) Date of Patent: Jan. 31, 2012

(54) INTERIM PHY SOLUTION FOR LPI COMPATIBILITY WITH LEGACY DEVICES

(75) Inventor: Hugh Barrass, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 230 days.

(21) Appl. No.: 12/277,010

(22) Filed: Nov. 24, 2008

(65) Prior Publication Data

US 2010/0128738 A1    May 27, 2010

(51) Int. Cl.
G08C 17/00 (2006.01)
G06F 1/26 (2006.01)

(52) U.S. Cl. .......... 370/229; 370/311; 713/320

(58) Field of Classification Search .......... 370/229–235, 370/276, 395.1, 412, 465, 469, 311; 713/320, 713/322, 323; 709/224, 230, 234, 235, 238; 455/343.1–343.6, 574

See application file for complete search history.

(56) References Cited

U.S. PATENT DOCUMENTS

| | | | | |
|---|---|---|---|---|
| 6,167,029 A | * | 12/2000 | Ramakrishnan | 370/235 |
| 2003/0165142 A1 | * | 9/2003 | Mills et al. | 370/395.62 |
| 2005/0102419 A1 | * | 5/2005 | Popescu et al. | 709/238 |
| 2005/0259685 A1 | * | 11/2005 | Chang et al. | 370/469 |
| 2006/0109784 A1 | * | 5/2006 | Weller et al. | 370/229 |
| 2009/0097392 A1 | * | 4/2009 | Diab et al. | 370/201 |
| 2009/0119524 A1 | * | 5/2009 | Hays | 713/322 |
| 2009/0201837 A1 | * | 8/2009 | Diab et al. | 370/276 |
| 2009/0327506 A1 | * | 12/2009 | Diab | 709/230 |

OTHER PUBLICATIONS

Joseph Chou, EEE Compatible MII/GMII Interface (revised), May 2008, pp. 1-19.*
Brad Booth, Backplane Ethernet Low-Power Idle, May 2008, pp. 1-14.*
Dimitry Taich, 10Base-T Low-Power Idle Proposal, May 2008, pp. 1-22.*
Adam Healey, 1000Base-T Low-Power Idle, May 2008, pp. 1-22.*
Booth, Backplane Ethernet Low-Power Idle, May 2008, IEEE: http://www.ieee802.org/3/az/public/may08/booth_01_0508.pdf.
Chou, EEE Compatible MII/GMII Interface (revised), IEEE 802.3az Interim Meeting, May 2008, IEEE: http://www.ieee802.org/3/az/public/may08/chou_03_0508.pdf.
Healey, 1000BASE-T Low-Power Idle, IEEE P802.3az Task Force, Munich, Germany, May 13, 2008, IEEE: http://www.ieee802.org/3/az/public/jan08/healey_01_0108.pdf.
Taich, 10BASE-T Low-Power Idle Proposal, 802.3az Plenary meeting, May 11, 2008, IEEE: http://www.ieee802.org/3/az/public/may08/taich_02_0508.pdf.

* cited by examiner

Primary Examiner — Aung S Moe
Assistant Examiner — Prince Mensah
(74) Attorney, Agent, or Firm — Fish & Richardson P.C.

(57) ABSTRACT

In one embodiment, a modified local PHY is adapted to couple a legacy host device to link partner implementing Energy Efficient Ethernet. The modified local PHY includes a buffer and if the legacy host transmits data when the modified local PHY is in a Low Power Idle (LPI) state then the data is stored in the buffer and transmission is paused until the modified local PHY transitions from the LPI state to an active state.

13 Claims, 4 Drawing Sheets

US 8,107,365 B2

INTERIM PHY SOLUTION FOR LPI COMPATIBILITY WITH LEGACY DEVICES

TECHNICAL FIELD

The disclosure relates generally to providing backward compatibility to legacy devices when implementing IEEE 802.3az (Energy Efficient Ethernet).

BACKGROUND OF THE INVENTION

Ethernet transceivers include a Media Access Control device (MAC) and a Physical Layer Device (PHY) coupled by a Media Independent Interface (MII). The MAC layer is responsible for, among other things, controlling access to the media, and the PHY layer is responsible for transmitting bits of information across a link. In Ethernet the interface between the MAC and the PHY is specified by IEEE 802.3 and has evolved from the 10 pin MII (Media Independent Interface) for 10/100 Ethernet, to the 20 pin GMII (Gigabit Media Independent Interface) for GE, to the 36 pin XGMII (10 Gigabit Media Independent Interface) for 10GE along with other variants such as SMII, SGMII, XAUI and others.

IEEE P802.3az is currently defining a new Energy Efficient Ethernet mode of operation for multiple Ethernet PHYs. In particular 100BASE-TX, 1000-BASE-T, 10GBASE-T and some backplane PHYs will be modified to support a Low Power Idle (LPI) mode that allows the PHY and other system components to save energy during periods of low network traffic load.

This energy saving is achieved when using the LPI state because the 802.3az-compliant PHY's activity level may drop after it is instructed to enter the LPI state and it will receive ample warning to exit the LPI from 802.3az-compliant host side hardware (e.g. 802.3az-compliant MAC and host ASICs) before live network traffic is expected.

DESCRIPTION OF EXAMPLE EMBODIMENTS

Overview

A buffer is included in a first physical layer device (PHY) and the buffer is adapted to receive data from a host media access control device (MAC), not designed to be compliant with Energy Efficient Ethernet, when the first PHY is in a Energy Efficient Ethernet low-power idle (LPI) state.

A control circuit, included in the first PHY, is adapted to control the first PHY to respond to data sent from the host MAC when the first PHY is in the LPI state by signaling the host MAC to pause data transmission for a first pause period, writing data transmitted from the local MAC, before the local MAC pauses data transmission, into the buffer and transitioning the local PHY from the LPI state to an active state during a wake up period.

The control circuit is further adapted to control the first PHY to transmit data from the buffer to a link partner subsequent to completion of the wake period and before the completion of the first pause period and to transmit data received at the first PHY from the host MAC to the link partner after completion of the pause period.

Description

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. Further, each appearance of the phrase an "example embodiment" at various places in the specification does not necessarily refer to the same example embodiment.

Ordinarily, an implementation of the mechanisms described in IEEE 802.3az would require a complete re-architecture of both the MACs and the PHYs. Generally, the process of re-designing the custom silicon devices supporting the MAC function in a high density switching system is a major project that is normally undertaken infrequently. However, the largest energy saving opportunities manifest themselves in edge devices such as desktop computers, servers, IP telephones and similar devices. The developers of such edge devices would like to produce energy saving implementations but they cannot take advantage of the new standard until it is supported by high density aggregation systems such as Ethernet switches.

Various example embodiments are described below that enable energy savings in edge devices with only minor changes to the high density aggregation system.

Figure 1:
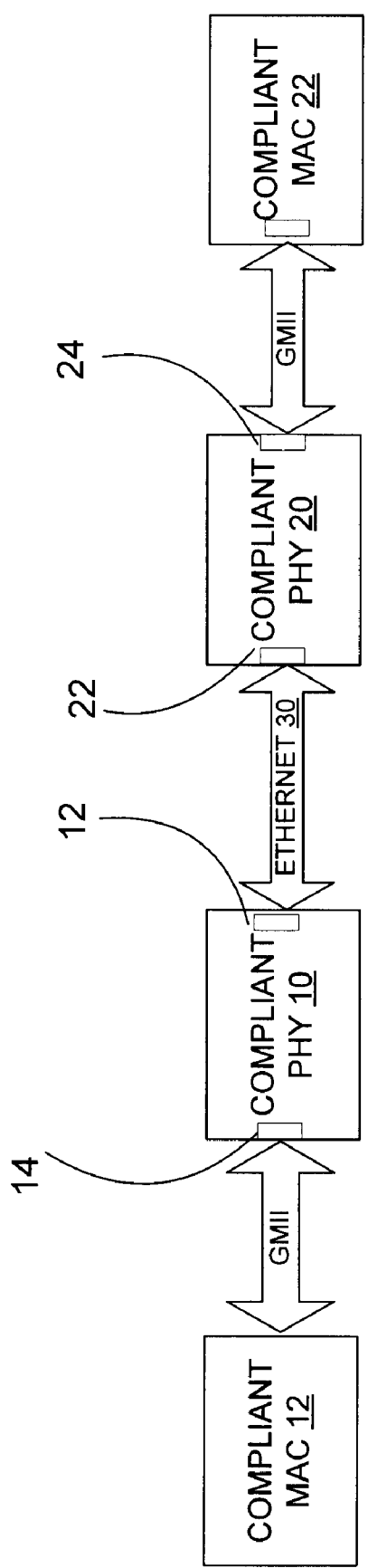
FIG. 1 illustrates an example of a system implementing Energy Efficient Ethernet.

FIG. 1 is a block diagram of a system utilizing a typical implementation compliant with Energy Efficient Ethernet. In FIG. 1, a first Ethernet PHY 10 has a line-side interface (Ethernet port) 12 and a host-side interface (GMII port) 14 coupled to a first MAC 12. A second Ethernet PHY 20 has a line-side interface (Ethernet port) 22 and an host-side interface (GMII port) 24 coupled to a second MAC 22. The first and second PHYs and MACs have been re-architectured to be compliant with IEEE 802.3az. The line-side interfaces 12 and 22 of both PHYs are coupled to an Ethernet link 30 and the host-side interfaces 14 and 24 are coupled to receive messages from the MACs over respective GMII buses.

The operation of the typical implementation will now be described. When the second PHY 20 receives a sleep code on its GMII 24 interface it transitions to the LPI mode and sends a notification to the first PHY 10 over the link 30. The first PHY 10 will then transition to the LPI mode and send a sleep code on its GMII interface 14 to the first MAC 12.

During LPI mode various systems are switched to low power states. These systems must be switched back to active states prior to resuming data communication over the Ethernet link. Accordingly, in a compliant system the local host MAC connected to the PHY must implement a wake period to allow the PHY to recover from the LPI mode. The local host does not attempt to send data until the wake period has elapsed and the PHY has recovered from the LPI mode.

Figure 2:
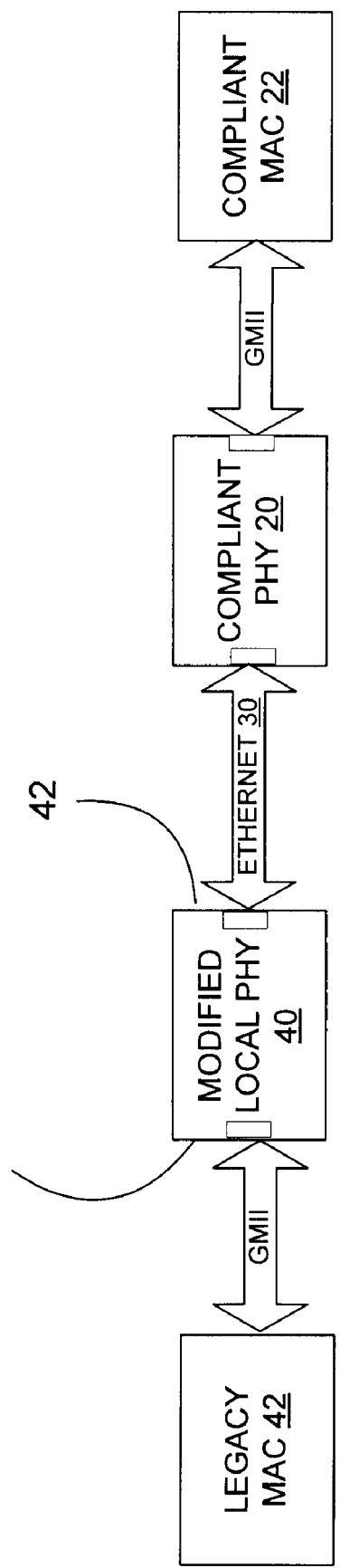
FIG. 2 illustrates an example embodiment of the invention.

FIG. 2 is a block diagram of an Ethernet link pair utilizing an example embodiment of a modified local PHY to implement Energy Efficient Ethernet (IEEE 802.3az). In FIG. 2 a modified local PHY 40 has a line-side interface 42 coupled to a compliant link partner over the link 30, where the link partner includes the compliant second PHY 20 and supporting hardware, e.g., the compliant MAC 22. The host-side interface of the modified local PHY 40 is connected by the GMII bus to a legacy MAC 42 and to other legacy hardware, such as switch fabric ASICs, that is not designed to be IEEE 802.3az compliant.

In the example depicted in FIG. 2, the receive circuit of the line-side interface of the modified local PHY 40 appears to the link partner to be fully IEEE 802.3az compliant. The receive circuit of the line-side interface 42 of the local PHY 40 receives notification that the transmit circuit of the link partner is going into LPI mode. There may follow periodic "refresh" activity before the local PHY 40 receives an indication that the transmit circuit of the link partner wishes to leave the idle mode in order to transmit data. There are specified delays for the transitions involved. An additional delay may be imposed on the link partner transmit side to prevent data being sent until some extra time has elapsed after the PHY-layer wake period. The local PHY 40 may support such idle operations without any interaction with its host system.

As described above, if the local system were 802.3az-compliant and in the LPI state, when the local host MAC wished to send data both the local PHY and link partner must transition to the active state. The local host MAC would notify the local PHY to begin the transition and the local PHY would send a wakeup signal to the link partner. The local host MAC would not attempt to send any data until sufficient time had elapsed to allow the local PHY and the link partner to transition from the LPI state to the active state. These operations would require hardware support from the MAC and switch fabric ASICs of the local system in addition to the new PHYs.

However, for a legacy system such support from the local MAC and switch fabric ASICs is not available. The local PHY 40 must control the decision to enter LPI mode, must interact with the link partner 20 and must shield the MAC and switch fabric ASICs from the detailed requirements of the Energy Efficient Ethernet operation. In a system designed to be compliant with 802.3az Energy Efficient Ethernet, the decision to enter the low power idle state is made by a management entity that is outside the definition of the standard. It has been assumed that complex analysis of system state and traffic patterns will be needed to implement an optimal energy saving algorithm. In a legacy system without hardware support from the local MAC and switch fabric ASICs the local PHY 40 may only receive background support from system software to assist the decision-making algorithm.

In one embodiment, the local PHY 40 waits for a fixed interval following the end of a packet that has been transmitted. If no following packet is to be sent before the end of the fixed interval then the local PHY 40 enters low power idle mode and signals the change of state to the link partner 20. The inherent burstiness of network traffic, especially at the edge of the network, causes the probability that another packet will need to be sent to decrease with time after the end of a packet that has been sent.

In another embodiment, the local PHY 40 will wait for an interval that is determined by the management software of the local system. This interval may vary depending on factors such as the time of day and the historical traffic patterns observed.

In yet another embodiment the local PHY 40 may implement an algorithm that allows it to vary the time it waits following a packet depending on its own observation of historical traffic. The precise nature of this algorithm could vary.

Furthermore, when the local PHY 40 has entered a low power idle state the legacy host MAC 42 might start to transmit data without regard for the specified delays required to transition from the LPI state to the active state. Data would arrive at the local PHY 40 before the system had transitioned to the active state and data would be lost.

Figure 3:
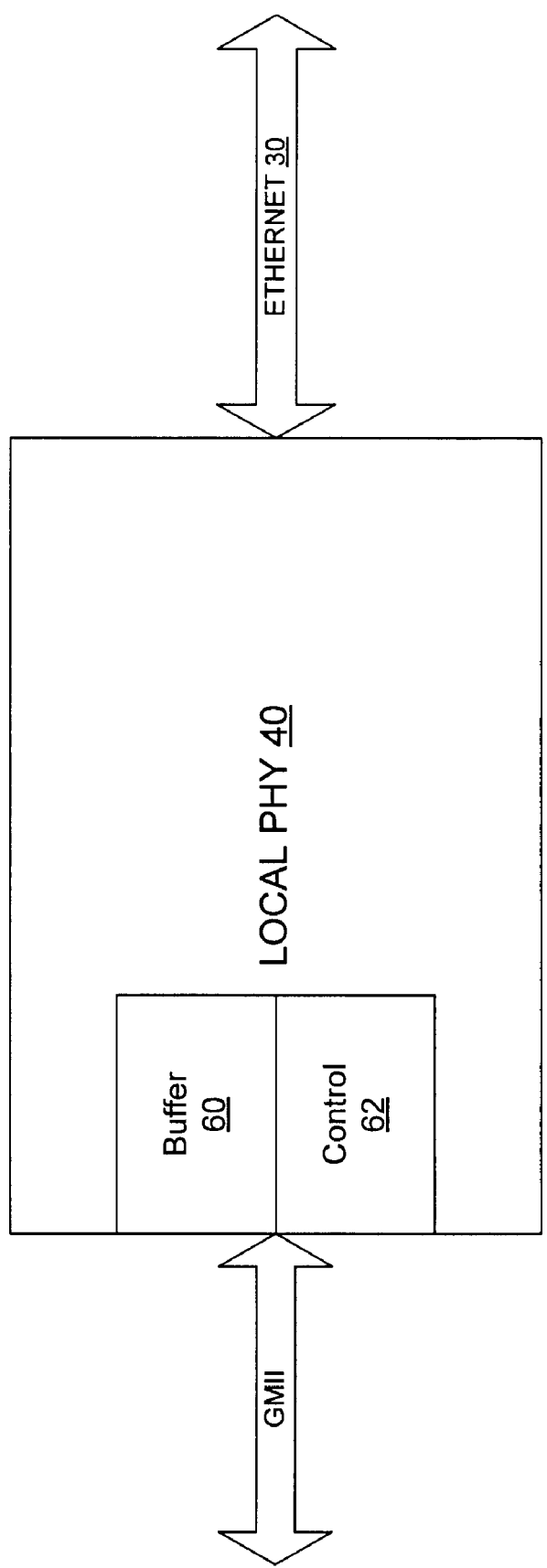
FIG. 3 illustrates an example embodiment of the local PHY.

FIG. 3 depicts an example embodiment of the modified PHY 40. The modified PHY includes a buffer 60 and a control circuit 62 for generating flow-control indications when data is received from the host and the local PHY is in the LPI state and for performing other functions described below.

Figure 4A:
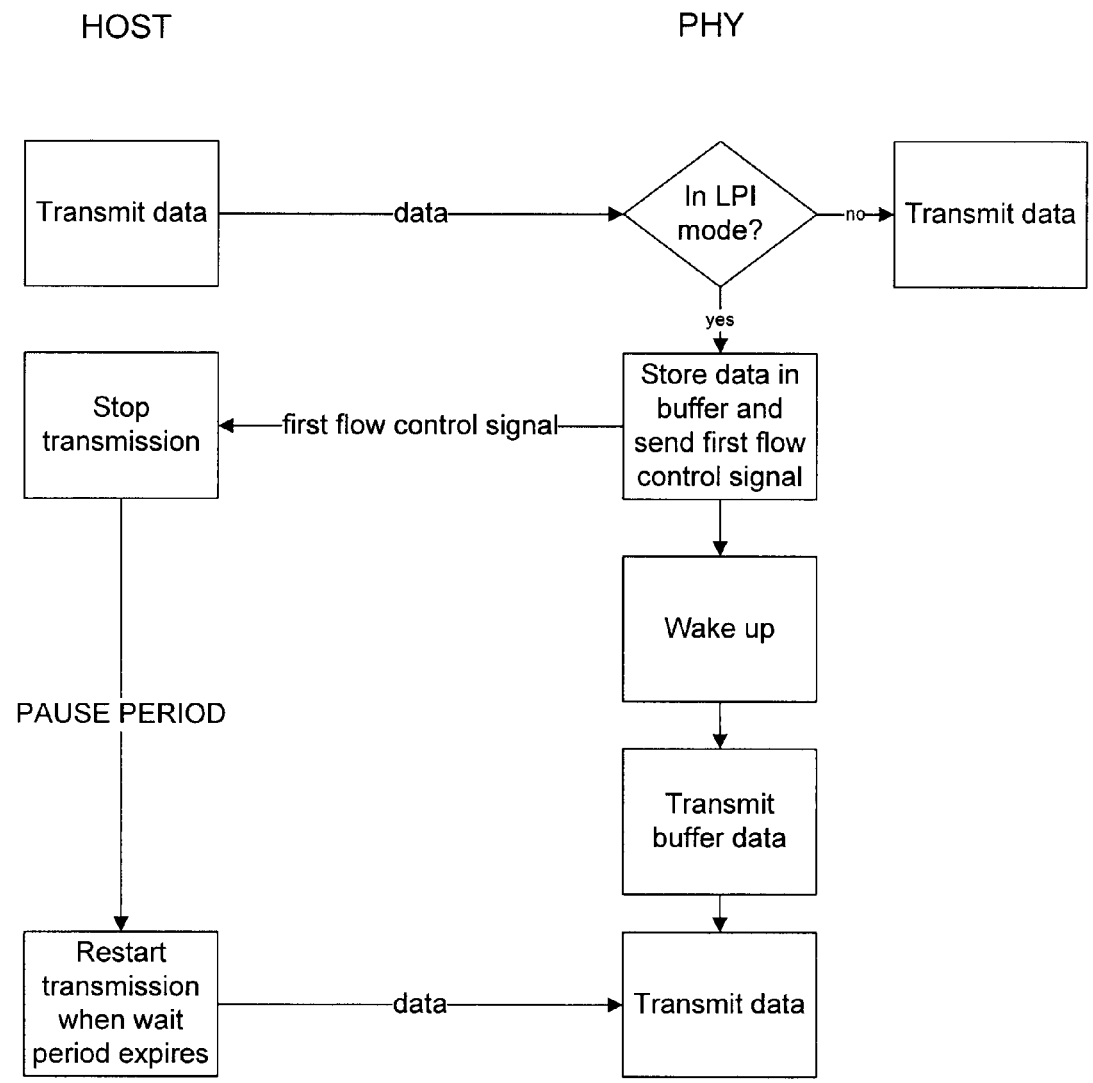
FIG. 4A illustrates the operation of an example embodiment.

The operation of the example embodiment depicted in FIG. 3 will now be described with reference to the flow chart of FIG. 4A. As depicted in FIG. 4A, if the local PHY is in the LPI state, then when the host starts to transmit data to the local PHY the data will be held in the buffer 60 and the control circuit 62 of the local PHY will control the local PHY to assert a first flow-control signal that causes the host to stop transmitting data. The depth of the buffer is determined by the response latency of the host MAC to the flow-control signal asserted by the modified PHY. The system has a known pause response latency from the MII (or equivalent) input to the MII output. At a minimum the buffer must absorb all data transmitted by the host until the first flow-control signal is acted upon and the host MAC has paused the transmission of data for a specified pause period.

In an example embodiment, the flow-control signal includes a field specifying the duration of the pause period. In the example embodiment depicted in FIG. 4A the duration of the pause period is specified to include the wake up period required to transition the local PHY 40 and the link partner PHY 20 from the LPI state and the buffer read period required to read data from the buffer. The buffer read period must be sufficient to read data from a full buffer because the amount of data stored in the buffer 60 is not determinable in advance.

The modified PHY 40 then signals wake up to the link partner PHY 20 and transitions all systems out of the LPI mode during the wake up period. After the appropriate wake up period expires, the modified PHY 40 transmits data from the buffer 60 to the link partner PHY 20 and prepares for the resumption of transmission of data from the local host. Once the wake up period expires the host resumes the transmission of data to the modified PHY 40 for transmission over the link.

The local PHY 40 supports a flow control mechanism to halt transmission on its 802.3az ports. In an example embodiment, flow control is implemented using IEEE 802.3x (PAUSE) but other mechanisms would be equally valid. As is known in the art, a PAUSE signal is sent by a receiving endpoint to a transmitting endpoint to assert backpressure when the receiving endpoint can not accept more data. Upon receipt of the PAUSE signal the transmitting endpoint sends a pause frame to the transmitting endpoint's MAC that specifies the duration of a pause period. No data is transmitted until the pause period expires.

In the example embodiment of FIG. 4A, if the local PHY is in the LPI state then the control circuit 62 causes the local PHY 40 to transmit a pause frame over the GMII bus to the local MAC upon receipt of data from the local MAC. Thus, the local PHY 40 "fakes out" the local MAC into behaving as if a pause signal had been received from the link partner PHY.

The operation of a second example embodiment will now be described with reference to the flow chart of FIG. 4B. In this embodiment first and second flow-control signals are asserted by the modified PHY 40. The first flow control signal specifies a first pause period having a long duration. The pause period could be equal to the pause period of the embodiment of FIG. 4A.

As in the embodiment of FIG. 4A, after the wake up period the control circuit 62 causes the local PHY 40 to read data from the buffer and transmit the data to the link partner PHY 20. In this embodiment the second flow-control signal is sent immediately when all the data has been read from the buffer and transmitted. Upon receipt of the second-flow control signal the local MAC immediately resumes transmission of data.

Figure 4B:
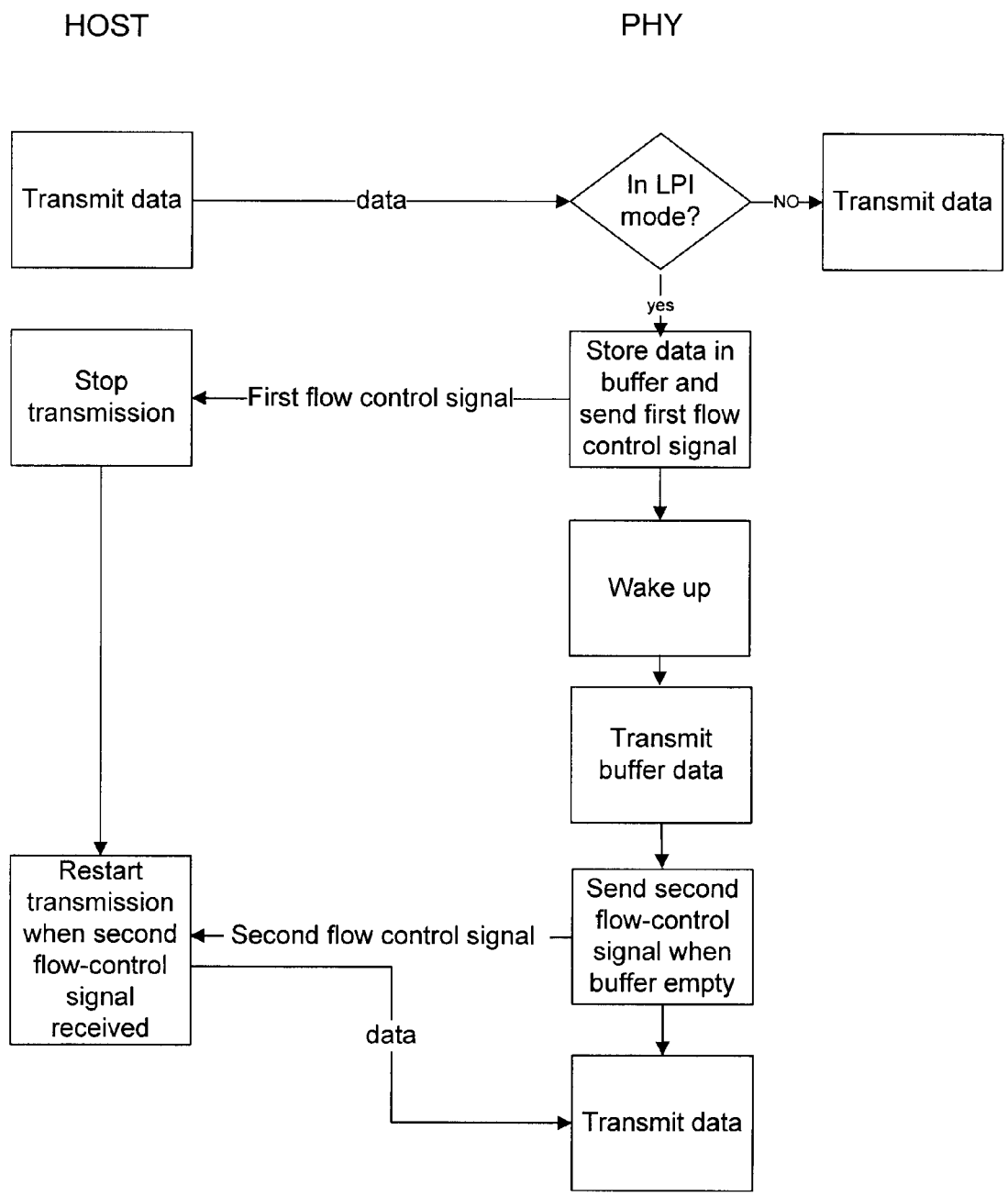
FIG. 4B illustrates the operation of an example embodiment.

The example embodiment of FIG. 4B reduces the latency caused by transitioning from the LPI state in the case where the buffer has not been filled during the pause response latency. Transmission from the MAC is resumed immediately when the buffer is empty instead of waiting for the expiration of the buffer read period specifying the time to empty a full buffer.

Various example embodiments of a modified PHY have been described that can be utilized in high density switching systems so that re-architecting the core silicon of the switching devices is not required. The modified PHYs can be utilized as interfaces between the legacy silicon, including MAC and switch fabric ASICs, of the high density switching devices and edge devices such PCs and servers.

The invention has now been described with reference to the example embodiments. Alternatives and substitutions will now be apparent to persons of skill in the art. For example, flow-control signals other than IEEE 802.2 PAUSE frames could be utilized if the legacy hardware supports such signals. Additionally, although example embodiments utilizing GMII or XGMII buses to communicate between the PHY and the MAC are described other bus structures can be utilized. Accordingly, it is not intended to limit the invention except as provided by the appended claims.

What is claimed is:

1. An apparatus comprising:
a buffer, included in a first physical layer device (PHY), with the buffer adapted to receive data from a non-compliant host media access control device (MAC when the first PHY is in an Energy Efficient Ethernet low power idle (LPI) state, where the non-compliant host MAC is not compliant with Energy Efficient Ethernet and where the non-compliant host MAC does not respond to the assertion of a flow-control signal until a fixed latency response interval has expired; and
a control circuit, included in the first PHY, adapted to control the first PHY to respond to data sent from the non-compliant host MAC to the PHY when the first PHY is in the LPI state by asserting the flow-control signal, with the flow-control signal signaling the non-compliant host MAC to pause data transmission for a first pause period, with the control circuit further adapted to write data transmitted from the non-compliant host MAC into the buffer while the non-compliant host MAC transmits data during the latency response period and to transition the first PHY from the LPI state to an active state during a wake up period, and with the control circuit further adapted to control the first PHY to transmit data from the buffer to a link partner subsequent to completion of the wake up period and before the completion of the first pause period and to transmit data received at the first PHY from the non-compliant host MAC to the link partner after completion of the pause period.

2. The apparatus of claim 1 where the control circuit is further configured to control the first PHY to:
send a first flow-control signal including information specifying a time period equal to the duration of the first pause period so that the host MAC pauses transmission until the first pause period completes.

3. The apparatus of claim 1 where the control circuit is further configured to control the first PHY to:
send a first flow-control signal including information specifying the duration of a time period longer than the first pause period; and
send a second flow-control signal specifying a time period of zero when all data from the buffer has been transmitted to signal the completion of the first pause period to the host MAC.

4. The apparatus of claim 1 where:
the buffer has sufficient capacity to store all words transmitted by the host until the transmission from the host MAC is paused.

5. The apparatus of claim 2 where:
the first flow-control signal is an IEEE 802.3x (PAUSE) frame.

6. The apparatus of claim 3 where:
the first and second flow-control signals are IEEE 802.3x (PAUSE) pause frames.

7. The apparatus of claim 1 with the control circuit further configured to control the first PHY to:
utilize inference algorithms under control of the host MAC to initiate sleep mode in the first PHY.

8. A method comprising:
asserting a flow control signal, using a controller on a first physical layer device (PHY), signaling a non-compliant host media access control device (MAC) to pause data transmission to the PHY for a first pause period when data is received at the first PHY and when the first PHY is in a low power idle (LPI) state, where the non-compliant host MAC is not designed to be compliant with Energy Efficient Ethernet and where the non-compliant host MAC does not respond to the assertion of the flow control signal until a response latency period has expired;
transitioning, using the controller, the first PHY from the LPI state to an active state during a wake up period;
transmitting data, received from the non-compliant host MAC and stored in a buffer on the first PHY during the response latency period, to a link partner PHY after the wake up period completes and before the first pause period completes, where the buffer has capacity to hold data received from the non-compliant host MAC during the response latency period;
unasserting the flow control signal, using the controller, after the first pause period expires;
and
transmitting data transmitted from the host MAC and received on the first PHY to the link partner PHY after the first pause period expires.

9. The method of claim 8 where signaling the host MAC comprises:
sending a first flow-control signal including information specifying a time period equal to the duration of the first pause period so that the host MAC pauses transmission until the first pause period completes.

10. The method of claim 8 where signaling the host MAC comprises:
sending a first flow-control signal including information specifying the duration of a time period longer than the first pause period; and sending a second flow-control signal specifying a time period of zero when all data from the buffer has been transmitted to signal the completion of the first pause period to the host MAC.

11. The method of claim 9 where sending a first flow-control signal comprises:

sending an IEEE 802.3x (PAUSE) frame.

12. The method of claim 10 where sending first and second flow-control signals comprises:

sending IEEE 802.3x (PAUSE) pause frames.

13. The method of claim 8 further:

utilizing inference algorithms under control of the host MAC to initiate sleep mode in the first PHY.

* * * * *